Feb. 18, 1964     C. ALINARI     3,121,333
INDICATING INSTRUMENT FOR DIVERS
Filed Jan. 23, 1961     2 Sheets-Sheet 1

Feb. 18, 1964 C. ALINARI 3,121,333
INDICATING INSTRUMENT FOR DIVERS
Filed Jan. 23, 1961 2 Sheets-Sheet 2

United States Patent Office 3,121,333
Patented Feb. 18, 1964

3,121,333
INDICATING INSTRUMENT FOR DIVERS
Carlo Alinari, 4 Via Giusti, Turin, Italy
Filed Jan. 23, 1961, Ser. No. 83,986
Claims priority, application Italy Jan. 30, 1960
7 Claims. (Cl. 73—411)

This invention relates to an instrument adapted to indicate the depth and period of decompression stages for divers in surfacing from a given depth.

It is known that nitrogen becomes dissolved in the tissues of the human body during diving according to an approximately hyperbolic law, the nitrogen content in the tissues being an increasing function of the diving depth and time.

The decompression stages on surfacing are adapted to free the tissues of the organism from nitrogen in order to avoid well known accidents.

For reading the decompression stages tables are presently in use which are based on suitable calculations. With the aid of a depth indicator the tables serve for ascertaining depth and time of the successive stoppages on surfacing as a function of the maximum depth attained and period of dwelling at the latter.

These tables are very inconvenient in use and unreliable for the data therein refers to given periods of dwelling at constant depths, while the diver actually moves all the time.

An object of this invention is to provide an instrument accurately indicating the decompression stoppages as a function of the immersion accomplished, which will be most convenient in reading and will avoid any calculation, uncertainty and error and inherent dangers of accidents.

A further object of this invention is to provide an instrument acting also as a memory, wherein the readings supplied in connection with surfacing after a dive are affected and properly corrected as a function of the dive or dives previously effected even some hours earlier.

The latter property is of special importance for it is known that nitrogen in the tissues of the human body is fully expelled only after a long time, about eight hours, after surfacing.

A further object of this invention is to provide an instrument which is of small size, tough in construction and safe and durable in operation.

Figure 1:
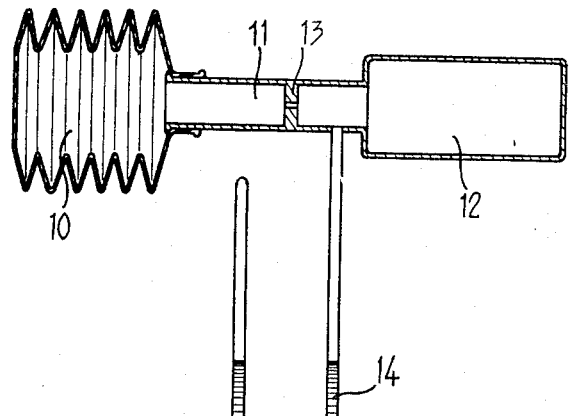
Figure 2:
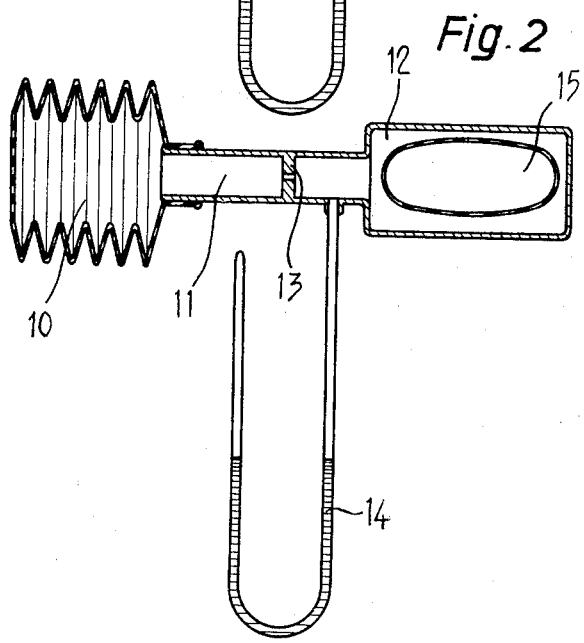
Figure 3:
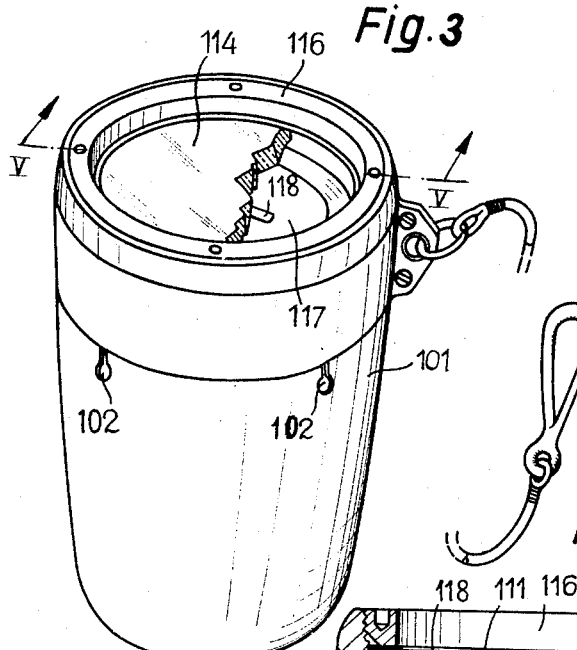
Figure 4:
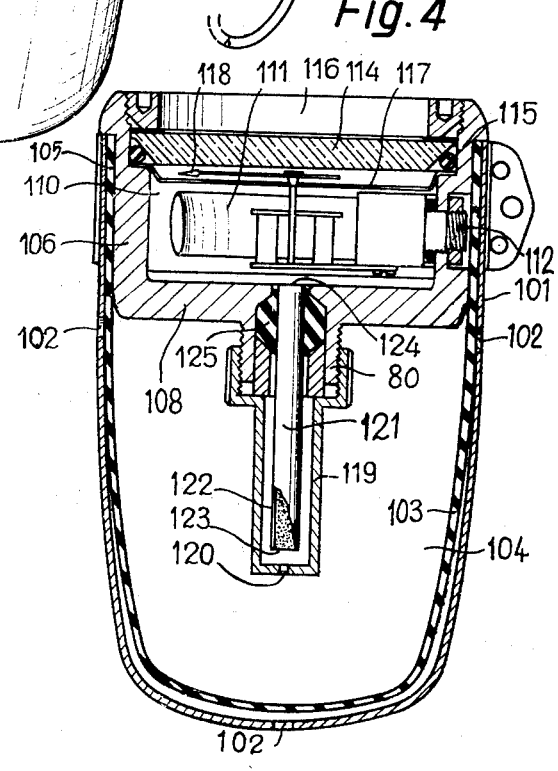

The above and further objects of this invention will be understood from the appended description, with reference to the accompanying drawings given by way of a non-limiting example wherein:

FIGURES 1 and 2 are vertical sectional views showing diagrammatically two embodiments of the improved instrument, FIGURE 3 is a perspective view showing a practical embodiment of this invention, and FIGURE 4 is a longitudinal sectional view on line V—V of FIGURE 3.

Referring to FIGURE 1 the improved instrument comprises a deformable chamber 10, of a bellows type externally subject to the hydrostatic pressure from the liquid into which the instrument is immersed. The chamber 10 connects through a conduit 11 with a non-deformable chamber 12, the chambers 10, 12 being filled with a comprissible fluid such as air. A throttle 13 is interposed in the conduit 11 to delay the flow of the fluid from either chamber to the other, and a pressure gauge 14 is provided for measuring the instantaneous pressure in the non-deformable chamber 12 with respect to an initial reference pressure, such as the air pressure at the surface of the liquid in which dive is effected. The throttle 13 may consist of a porous air-permeable partition.

The delay caused by the throttle 13 on flow of the fluid from either chamber to the other, is such that the displacement of the meniscus of the pressure gauge is a function of the depth attained and duration of dive at the said depth, and therefore varies in accordance with a law similar to the law of nitrogen absorption by the tissues of the human body immersed in water. The diver is thereby able to adjust the rate of surfacing by suiting it to the rate of movement of the meniscus of the pressure gauge.

In practice since a limited nitrogen excess in the tissues of the human body can be endured without any trouble, surfacing from deep dive is effected by stages at decreasing depths, the difference $\Delta h$ in depth between two stoppages being such that the corresponding pressure reduction involves the abovementioned tolerable excess nitrogen.

When using the improved instrument the time of each stoppage shall be such that the meniscus of the pressure gauge reaches each time its position corresponding to the hydrostatic pressure of the depth of dive on each stoppage.

According to FIGURE 2 the chamber 10 is filled with a liquid the chamber 12 being provided with a bladder 15 containing a compressible fluid.

According to the embodiment shown in FIGURES 3 and 4 the instrument comprises a container 101 formed with holes 102, enclosing a flexible casing 103 confining a first air-filled deformable chamber 104 subject through holes 102 to the hydrostatic pressure when the instrument is immersed. The casing 103 is generally of bag shape, its circumferential portion 105 surrounding the mouth being compressed and sealed between the container 101 and a box 106 having a bottom 108. The latter defines together with the casing 103 the chamber 104 and separates the latter from a chamber 110 within the air-filled box 106 enclosing a pressure gauge of a Bourdon tube type. The Bourdon tube 111 of the pressure gauge is secured to the box 106 by means of a sealed screw connection 112 and contains air at atmospheric pressure.

The chamber 110 is closed to the outside by a glass 114 of considerable thickness secured to the box 106 through the interposition of a packing 115 by means of a threaded ring 116 arranged as shown on the drawing. A dial 117 for the pressure gauge is arranged beneath the glass 115, a pointer 118 moving over the dial.

The bottom 108 is provided on its side defining the chamber 104 with a screw-threaded spigot 80 having secured thereto a tubular extension 119 formed in its bottom with a hole 120. A porous ceramic plug 121 is arranged within the cylindrical extension 119 and spigot 80 and is covered on its circumferential surface with a layer of enamel 122. The free ends 123 and 124 of the plug are not glazed and connect through the hole 120 with the chamber 104 and with the chamber 110, respectively.

A sealing ring 125 supports the plug 121 and seals the chambers 104, 110 against each other, whereby the fluid contained in either chamber reaches the other chamber necessarily through the porous plug 121.

In the instrument shown on FIGURES 4 and 5 the two chambers 104, 110 initially contain air at identical pressure. Under such conditions the pointer 118 of the pressure gauge is on the zero mark on the dial. On diving, the water contacts the flexible casing 103 through the holes 102 in the container 101, the hydrostatic pressure deforming the casing, whereby the fluid pressure in the chamber 104 rises.

By effect of increased pressure set up in the chamber 104 with respect to the chamber 110 the air tends to flow from the first one to the other through the ceramic plug 121 which delays the change in pressure in chamber 110.

The increasing differential pressure of air in the chamber 110 with respect to that entrapped in the Bourdon tube 111 acts on the said tube to deform it, whereby the pointer 118 moves over the dial in a predetermined direction, such as clockwise. After a given period of time at a constant depth of dive the fluid pressure in the chamber 110 stabilizes at a given value. The reading of the pointer in such condition may, with proper calibration, denote on the dial 117 the depth of stoppage for the first decompression stage in the course of surfacing. During surfacing the process is reversed, the fluid flow from chamber 110 to chamber 104 causes a negative variation in pressure. Consequently, during surfacing the sinking in pressure in the chamber 110 causes the tube 111 of the pressure gauge to become deformed in an opposite direction, the pointer 118 moving over the dial counterclockwise. The drop in fluid pressure through the plug 121 and graduation of the instrument dial are so correlated that the readings of the pointer 118 give the successive stoppages in time and depth to suit the physiological law according to which nitrogen is expelled from the tissues.

In use the depths of the decompression stages given by the pointer on the dial shall be ascertained by means of a suitable device, such as a depth gauge.

Since ascent after dive is effected by successive stages with stoppages at decreasing depths, on surfacing after the last stoppage a given excess nitrogen persists in the tissues of the human body which corresponds to the pressure drop through the last partial depth $\Delta h$ which has been overcome; the said excess is to be exhausted only after a period of time of between six and eight hours. Accordingly, the instrument maintains the said reading relating to the hydrostatic pressure at the depth of the last stoppage, the pointer 118 being restored only after a period of time as required for equalizing pressures in the chambers 110 and 104. The result is that when the instrument is again immersed after surfacing the reading previously memorised and stored is summed up with the fresh readings of the instrument, so that on subsequent ascent the pointer 118 moves over the dial according to a new law which takes care of the previously stored readings.

What I claim is:

1. Decompression stage indicator for divers comprising two interconnecting fluid-filled chambers, one of said chambers being non-deformable and filled in part at least with compressible fluid, the other chamber being deformable and externally subject to hydrostatic pressure when the instrument is immersed in water, a conduit interconnecting said chambers including means adapted to delay the flow of fluid from either chamber to the other in approximation to a physiological law when the deformable chamber undergoes variations in volume due to variations in hydrostatic pressure and means indicating the fluid pressure in said non-deformable chamber with respect to a reference pressure.

2. Instrument as claimed in claim 1, wherein the fluid in both chambers is a gas.

3. Instrument as claimed in claim 1, wherein the fluid in both chambers is a liquid, and wherein the non-deformable chamber includes a sealed gas-containing bladder.

4. Indicator as claimed in claim 1, wherein the fluid contained in both chambers is a gas, and the means interposed in said conduit to delay the flow comprises a porous ceramic plug.

5. Indicator as claimed in claim 3, wherein the means interposed in said conduit to delay the flow comprises a partition formed with a calibrated throttling passage.

6. Indicator as claimed in claim 1, wherein the means for reading the fluid pressure in the non-deformable chamber comprises a pressure gauge including a Bourdon tube containing a fluid at a reference pressure, the fluid pressure in said chamber being read with respect to said reference pressure.

7. A decompression stage indicator for divers as claimed in claim 1, in which the deformable chamber comprises a deformable casing subject to hydrostatic pressure when the instrument is immersed in a liquid, a box open on only one side, a transparent glass sealing the open side of the box, said box and said glass forming the non-deformable chamber, a conduit connecting the non-deformable and deformable chambers and enclosing a ceramic plug, said fluid pressure indicating means comprising a pressure gauge, and both chambers containing air.

References Cited in the file of this patent
UNITED STATES PATENTS

| | | |
|---|---|---|
| 1,884,896 | Smith | Oct. 25, 1932 |
| 2,244,335 | Hopkins | June 3, 1941 |
| 2,379,293 | Goddard | June 26, 1945 |
| 2,412,740 | Morgan et al. | Dec. 17, 1946 |
| 2,632,374 | Klemperer | Mar. 24, 1953 |
| 2,931,221 | Rush | Apr. 5, 1960 |
| 2,935,873 | Stewart | May 10, 1960 |
| 2,979,948 | Gwathmey | Apr. 18, 1961 |